May 23, 1950     G. GUANELLA     2,509,057
DEVICE FOR INTERCOUPLING SINGLE-ENDED
AND DOUBLE-ENDED CIRCUITS
Original Filed Nov. 27, 1943
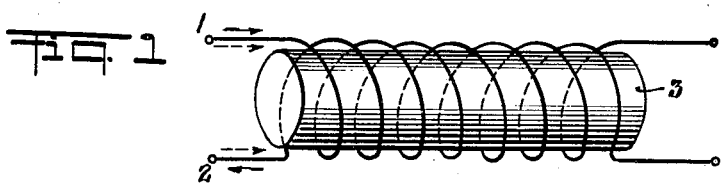
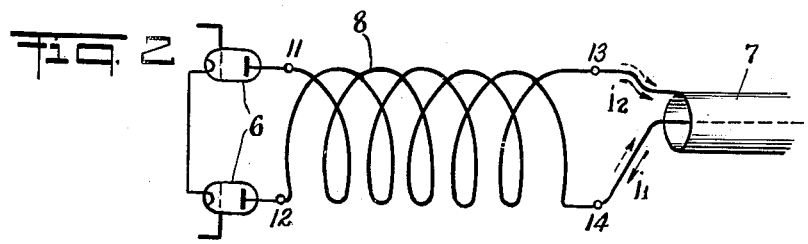
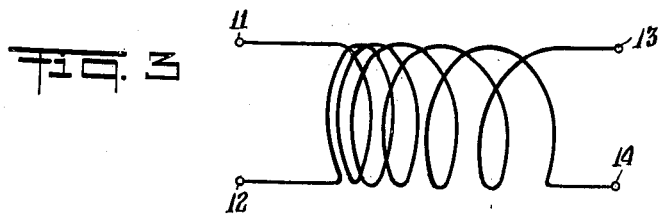
INVENTOR.
*Gustav Guanella*
BY
ATTORNEY Patented May 23, 1950

2,509,057

UNITED STATES PATENT OFFICE 2,509,057

DEVICE FOR INTERCOUPLING SINGLE-ENDED AND DOUBLE-ENDED CIRCUITS

Gustav Guanella, Zurich, Switzerland, assignor to Radio Patents Corporation, New York, N. Y., a corporation of New York Original application November 27, 1943, Serial No. 512,069. Divided and this application June 6, 1945, Serial No. 597,821. In Switzerland October 8, 1942

Section 1, Public Law 690, August 8, 1946
Patent expires October 8, 1962

2 Claims. (Cl. 178—44)

This application is a division of my abandoned application Serial No. 512,069, filed November 27, 1943.

The present invention relates to an arrangement for transferring high frequency energy from a symmetrical or double-ended circuit to an unsymmetrical or single-ended circuit and vice versa, the object of the invention being the provision of a device of this type which is simple in construction and efficient in operation, which requires little space, which can be easily adapted to suit existing conditions and practical requirements and which will insure a maximum of energy transfer between said circuits.

The invention will become further apparent from the following detailed description taken in reference to the accompanying drawing forming part of this specification and wherein:

Figure 1 shows a spirally wound two-wire transmission line serving as an intercoupling element in accordance with the invention;

Figure 2 shows a coupling line according to Figure 1 connecting a symmetrical input circuit with an unsymmetrical output circuit; and Figure 3 shows a modified construction of a transmission coupling line constructed in accordance with the principle of the invention.

Referring to Figure 1, the conductors 1 and 2 of a length at least equal to a quarter of the length of the operating wave are wound in an axially symmetrical manner in the form of a double spiral upon an insulating body 3. If the oscillation currents of the coil system are exactly in opposite phase, as indicated by the full arrows, the magnetic fields produced by these currents neutralize each other and the coil axis has practically no field. The coil system thus no longer has the character of an inductance. If, however, the currents are in phase, as indicated by broken arrows, the coil system represents a considerable reactance; that is to say oscillations of the same phase are to a great extent suppressed. A coil according to Figure 1 may for instance be used for artificially extending an electric two-wire line.

If a double threaded coil according to Figure 1 is connected to a single ended or unsymmetrical load or consumer, the current passing through the coil may be symmetrized in accordance with the present invention. Thus, Figure 2 shows an arrangement wherein a push-pull vacuum tube circuit 6 having output terminals 11 and 12 which supply a voltage symmetrical with respect to ground, is connected to a single-ended load circuit in the form of a concentric high frequency cable 7 having input terminals 13 and 14, of which the former connected to the outer concentric conductor is usually at ground potential. For oscillations with opposite phases (full arrows) the coil system 8 represents a transmission line of definite length. For oscillations occurring in phase (broken arrows), system 8 represents a considerable inductance so that these are not transmitted. Even if the output end of the line has one pole grounded, only currents of opposite phase may flow. A symmetrical loading of the input tubes is thus obtained despite the unsymmetrical earthing of the cable 7. The symmetrising of the currents effected by the system causes the current $i_1$ through the central conductor to be exactly equal and of opposite phase to the current $i_2$ through the outer conductor; that is to say additional and undesirable equalizing currents over the cable cover are avoided.

The systems illustrated may also be used for matching purposes if the wave resistance of the wound transmission line 8 coincides with the geometric mean of the internal resistances of the systems to be connected and if furthermore its effective length amounts to approximately ¼ wave length.

The matching of two systems with unequal internal resistance is also possible with a transmission line coupling whose wave resistance is different at both ends. Such a conductor, where the characteristic or wave resistance has been made variable by altering the distance between the wires, is shown in Figure 3.

The invention is of course not restricted to the constructional examples described above but can be applied to various modified forms. The turns of the coil need not necessarily be wound on an insulator. If the conductors are rigid enough they can form a freely supported coil without core. If the coil turns have to have a high capacity to earth, they can be wound on an earthed metal cylinder, preferably a hollow cylinder.

As is well known, the characteristic or wave impedance of a high frequency transmission line is determined essentially by the square root of the ratio between the distributed inductance and the distributed capacity per unit length of the line. Accordingly, by suitably controlling the spacing between the wires, as shown in Figure 3, a gradual transition of the impedance may be achieved from one end to the other end of the line to effect a proper impedance match with the circuits connected to the ends of the line. Thus, in Figure 3, the impedance of the line at its terminals 11—12 is relatively low due to the close spacing or high distributed capacity at this point and increases gradually towards the terminals 13—14. The circuits of higher and lower internal impedance are accordingly to be connected to the terminals 11—12 and 13—14, respectively.

As will be understood, the invention is not limited to the specific example shown in the drawing. Thus, as pointed out, the turns of the coil may be self-supporting and if the coil turns have a high capacity to ground, they may be wound upon a metallic cylinder, preferably a hollow cylinder. These and other variations as well as the substitution of equivalent elements for those shown and disclosed may be made in accordance with the broader scope and spirit of the invention as defined in the claims.

I claim:

1. A high frequency electrical system comprising a single-ended circuit, a double-ended circuit, and energy transfer means interposed between said circuits and constituted by a two-wire transmission line of a length of the order equal to at least one quarter of the length of the operating wave and wound into a double threaded spiral with the pitch of said spiral gradually varying from one end to the opposite end of the line, said line having its input ends connected to one of said circuits and having its output ends connected to the other circuit.

2. A high frequency electrical system comprising a first circuit having a pair of terminals carrying potentials symmetrical with respect to ground if said circuit is excited by high frequency energy, a second circuit having a pair of terminals one of which is at ground potential, and energy transfer means consisting of a two-wire transmission line connecting said circuits, said line having a length at least equal to a quarter of the length of the operating wave and being wound into a double-threaded spiral with the pitch of said spiral increasing gradually from one end to the opposite end of the line and in a direction from the circuit of relatively low internal impedance to the circuit of relatively high internal impedance.

GUSTAV GUANELLA.

REFERENCES CITED

The following references are of record in the file of this patent:

UNITED STATES PATENTS

| Number | Name | Date |
|---|---|---|
| 1,964,048 | Gerth | June 26, 1934 |
| 2,124,212 | Rust | July 19, 1938 |
| 2,126,541 | De Forest | Aug. 9, 1938 |
| 2,139,055 | Wright | Dec. 6, 1938 |
| 2,178,653 | Slade | Nov. 7, 1939 |
| 2,190,448 | Freygang | Feb. 13, 1940 |
| 2,246,188 | Roder | June 17, 1941 |
| 2,247,217 | Braaten | June 24, 1941 |
| 2,273,465 | Carter | Feb. 17, 1942 |
| 2,297,514 | Von Baeyer et al. | Sept. 29, 1942 |
| 2,379,168 | McClellan | June 26, 1945 |